Patented Apr. 2, 1929.

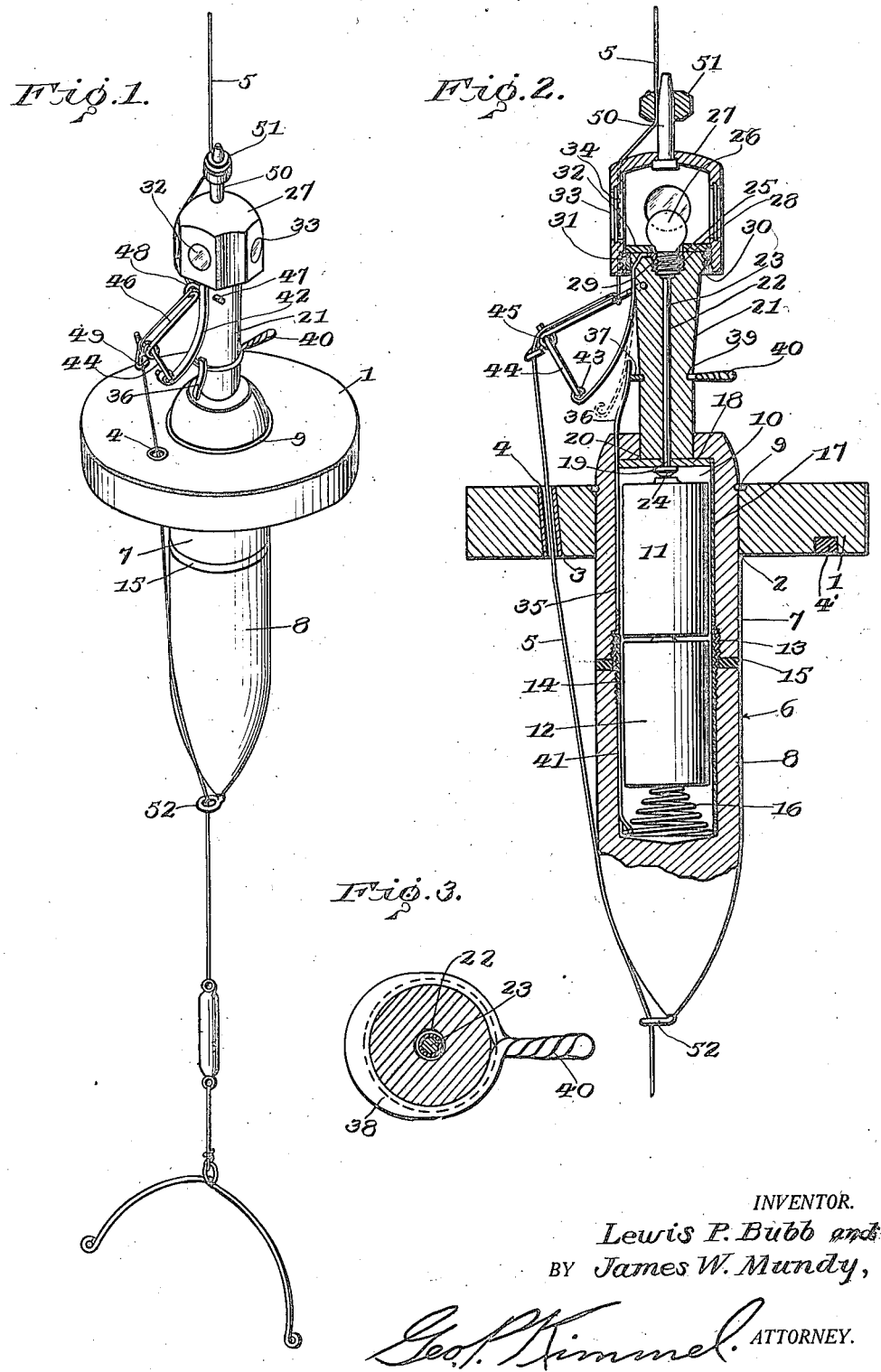

1,707,901

UNITED STATES PATENT OFFICE.

LEWIS P. BUBB AND JAMES W. MUNDY, OF BALTIMORE, MARYLAND.

ELECTRIC FISHING FLOAT.

Application filed March 10, 1927. Serial No. 174,266.

This invention relates to a fish line float and has for its object to provide, in a manner as hereinafter set forth, a float of such class including an electrical illuminable means normally inactive and in an open circuit and thrown into activity by a pull on the line for signalling to a fisherman, particularly at night, of a strike, bite or catch, more particularly a catch.
A further object of the invention is to provide, in a manner as hereinafter set forth, a fish line float having as a part thereof an electrical illuminable means normally inactive and in an open circuit and further having a part thereof a circuit opening and closing device for said means sustained above the water line whereby the durability of said device is increased and its operation not impaired.
A further object of the invention is to provide, in a manner as hereinafter set forth, a fish line float having as a part thereof respectively a normally inactive electrical signalling means, a circuit opening and closing device operated from a pull on the line to cause the activity of said means for signalling purposes thereby, and means for adjusting the circuit opening and closing device whereby it can be operated to throw into activity a signalling means by a slight or a heavy pull on the line respectively by small or large fish, or in other words the activity of the signalling means can be controlled so as to provide for its operation solely by large fish or by fish of any size.
Further objects of the invention are to provide, in a manner as hereinafter set forth, a fish line float of the electrical signalling type, and which is simple in its construction and arrangement strong, durable, compact, thoroughly efficient in its use, adjustable, quickly installed with respect to the line, and comparatively inexpensive to manufacture.
With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be restorted to which fall within the scope of the claims hereunto appended.

In the drawings wherein like reference characters denote corresponding parts throughout the several views:
Figure 1 is a perspective view of a fish line float in accordance with this invention and with the electrical signalling means in inactive position.
Figure 2 is a vertical sectional view of the float and illustrating, in full lines, the circuit opening and closing device for the electrical signalling device in open position and in dotted lines in closed position to provide for the activity of the electrical signalling means.
Figure 3 is a fragmentary view in plan illustrating the adjusting means for the circuit opening and closing device to provide for the operation therefor by a light or heavy pull on the line.
Referring to the drawings in detail 1 denotes a float member of any suitable size and contour, but as shown by way of example it is set up in the form of a circular disk of appropriate diameter and provided with a centrally arranged opening 2 and an inclined channel 3 spaced from the opening 2 having secured therein a wear sleeve 4, which is flush with the upper and lower faces of the float member 1. The wear sleeve 4 is preferably constructed of metallic material and forms a conduit for the line 5 and acts as a means to prevent the wearing off of the body of the float member due to the action of the line 5. The wear sleeve 4 is disposed at an inclination and the inclination is inward from its upper towards its lower end. A balance 4' is provided for the float member.
Fixedly secured to the float member 1 as well as extending above and depending from the latter, is a housing referred to generally by the reference character 6 and having its body portion formed of an upper section 7 and a lower section 8. The housing 6 is constructed of any suitable material, preferably a material possessing a characteristic for floating but it is to be understood that the housing 6 can be constructed of any suitable material. The float member 1 is secured to the section 7 in proximity to the upper end of the latter by frictional engagement between the outer periphery of the section 7 and the wall of the opening 2. The section 7 carries a peripheral stop member 9 which is disposed circumferentially with respect thereto and is adapted to bind in the wall of the opening 2 at the top of the latter. It is to be understood however, that the housing 6 can be secured to the float member 1 in any desirable manner or by any suitable means. The float member 1 is secured to the section 7, of the housing 6, at a point between the transverse median of the latter and the upper end thereof. The housing 6 is formed of non-conducting material. The section 7 as well as the section 8 is hollow and when the said sections are secured together they provide a chamber 10 for the reception of one or more storage batteries 11, 12. When two or more batteries are arranged within the chamber 10 they are positioned in superposed relation and in electrical contact with each other.

Secured to the inner face of the section 7, at the lower end thereof, is a threaded collar 13 having its lower edge flush with the lower edge of said section 7. Secured to the inner face of the section 8, at the upper end thereof, is a threaded sleeve 14 which projects above the upper edge of the section 8 and into the section 7 and has threaded engagement with the collar 13 whereby the two sections are secured together to provide the chamber 10. For the purpose of forming a water tight joint between the sections 7, 8 a packing 15 is interposed between the opposed edges of said sections and the packing 15 is of the compressible type. The packing 15 is constructed of non-conducting material.

Arranged within the chamber 10, at the bottom thereof is a spiral spring 16 of conducting material and which has electrical contact with the bottom of a single battery, when one battery is used, or with the bottom of the lowermost battery when two or more batteries are used. As illustrated the spring 16 is in electrical contact with the bottom of the battery 12. The top of the bottom battery 12 is in elecrical contact with the bottom of the battery 11. The wall of the chamber 10 and bottom thereof are provided with a coating of impervious material possessing a non-conducting characteristic and which is indicated at 17. The coating 17 can be dispensed with if desired. Arranged within the chamber 10 at the top thereof is a disk 18 of any suitable non-conducting material and which is of the same diameter as the diameter of the chamber 10. The disk 18 is formed with an opening 19 and the top of the section 7 with an opening 20 of materially greater diameter than the opening 19. Secured at its lower end to the wall of the opening 20 and abutting against the disk 19 is a tubular member 21 of appropriate height and diameter and which gradually increases in diameter from its transverse center to its upper end. The tubular member 21 is constructed of any suitable material, preferably non-conducting material and the passage formed thereby is indicated at 22 and is of a diameter to have its walls snugly fit a conductor 23 which extends through the disk 18 and has its lower end provided with a contact 24 which is in electrical engagement with the battery 11. The upper end of the conductor 23 is electrically connected to the plug 25 of a lamp 26 which extends into a lamp house 27, the latter being of polygonal contour. The plug 25 electrically and threadably engages with a threaded collar 27 which is seated in a socket 29 formed in the upper end of the tubular member 21 and the latter provides a support for the lamp house 27. The upper end of the support 21 is provided with a peripherally arranged threaded collar 30 which has threaded engagement with the inner face of the body portion of the lamp house at the lower part thereof as indicated at 31 for securing the lamp house to the support 21. Arranged within the lamp house 27 and mounted on the support 21 is an apertured disk 32 which provides the bottom of the lamp house 27 and through which extends the lamp 26. Each alternate wall of the lamp house 27 is formed with an opening 33 in which is mounted a lens 34 of transparent material.

Electrically connected with the collar 13, extending upwardly in the section 7, as well as projecting a substantial distance above the top of the section 7 is a conductor 35 having the upper terminal portion thereof forming a resilient contact 36 permanently seating against an adjusting means 37 therefor which is revolubly mounted upon the tubular member 21. The adjusting means 37 consists of a cam 38, see Figure 3, in the form of a band which seats in a groove 39 formed in the periphery of the member 21. The cam 38 is horizontally disposed and provided with a handle member 40 to facilitate the shifting thereof. The purpose of the adjusting means 37 is for shifting the resilient contact portion 36 of the conductor 37 in a manner to position it at varying distances from the member 21, and when shifted outwardly with respect to the member 21 it provides for a quicker contact or rather a quicker closing of the lamp circuit than if said resilient contact 36 was positioned nearer the member 21. The resilient contact 36 forms a part of the circuit opening and closing device for the circuit of the lamp 26. Electrically connected to the sleeve 14 and to the spring 16 is a conductor 41 which is positioned within the section 8 of the housing 6.

The circuit opening and closing device for the lamp circuit, not only includes the resilient contact 36, but also includes a resilient circuit opening and closing arm 42 which normally projects from and is clear of the contact 36, see Figure 1. The arm 42 is integral with the collar 28 and has its upper part mounted on and extending through the tubular member 21. The upper part of the arm 42 bears upon the tubular member 21 and the lower portion thereof is upon an outwardly directed curve and is normally clear of the contact 36. The lower end of the arm 42 has pivotally connected therewith, as at 43 a shifting bar 44 therefor which has its upper end pivotally connected as at 45, to the lower end of an actuating member 46 therefor and said member 46 at its upper end is pivotally mounted as at 47 in the upper part of the tubular member 21. The actuating member has its upper part provided with an eye or loop 48 for the passage of the line 5 and its lower end also provided with an eye or loop 49 for the passage of the line 5. The loops 48 and 49 provide guides for the line.

Secured to the top of the lamp house 27 and projecting upwardly therefrom is a protuberance 50 forming one element of a clamp, and the other element thereof is provided by a collar 51 which coacts with the protuberance 50 for clamping the line 5 to the latter, the line 5 extending between the collar 51 and protuberance 50 see Figure 2 and the collar 51 binds the line 5 to prevent the shifting thereof or rather anchoring the same to the lamp house 27.

The lower end of the section 8 of the body portion 6 is provided with an eye or loop 52 which also provides a guide for the line 5.

The adjusting means 37 can position the contact 36 for the purpose of it co-acting with the circuit opening and closing arm 42 to cause the closing of the lamp circuit on a light pull of the line 5 or on a heavy pull of the latter. The greater the distance between the contact 36 and arm 42 the greater the pull required on the line 5 to close the lamp circuit and the shorter the distance between the contact 36 and arm 42 the lighter the pull required on the line to close the lamp circuit.

When the float is mounted in the water the circuit opening and closing device is arranged above the level thereof and the tubular member 21 is of sufficient height so that when the lamp circuit is closed, the signal will be readily visible by the fisherman. When the float is positioned in the water, after the contact 36 has been adjusted by the cam 38, on a pull of the line 5, the arm 42 will be brought into electrical contact with the upper terminal portion 36 of the conductor 35, under such conditions closing the lamp circuit and signalling the fisherman of a strike, bite or catch. When the line 5 is relieved of the pull the arm 42 will automatically spring away from the resilient contact 36, under such conditions opening the lamp circuit. As the lamp house 27 is provided with spaced lenses, the signal can be seen from any direction.

It is thought the many advantages of a fish line float, in accordance with this invention can be readily understood, although the preferred embodiment of the invention is as illustrated and described, yet it is to be understood that changes in the details of construction can be had which will fall within the scope of the invention as claimed.

What we claim is:

1. A fish line float including a float member provided with an opening for the passage of the line, an electrical signalling means arranged above said float member, normally in an open circuit and provided with a line connecting element, a signalling means supporting structure connected intermediate its ends to and centrally of the float member to extend above and below the latter, said signalling means mounted on the top of said structure, and means interposed between said signalling means and said float member for connection to and operated by a pull on the line for closing the circuit for said signalling means to make the latter active, the said last mentioned means arranged exteriorly of the float member, signalling means and supporting structure and carried by the latter.

2. A fish line float including a float member in the form of a disc, an electrical signalling means arranged thereabove, normally in an open circuit and having a line connecting element, a supporting structure connected intermediate its ends with and centrally of the float member, said structure projecting above and depending below the float member, said signalling means mounted on the top of said structure, a contact element carried by said structure, means interposed between said signalling means and said float member for connection with and operated by a pull on the line to engage the contact element for closing the circuit for said signalling means to make the latter active, said last mentioned means carried by said structure and arranged exteriorly of the float member, supporting structure and signalling means, and means carried by the supporting structure for adjusting the position of said contact element to provide for the closing of the signalling circuit at varying pulls on the line.

3. A fish line float including a float member provided therein with a sleeve for the passage of a line and further provided in one face with a counterbalance spaced from the sleeve, said sleeve opening at the top and bottom of the float member, an electrical signalling means arranged above the float member, normally in an open circuit and having a line connecting element, a signalling means supporting structure connected intermediate its ends to and centrally of said float member and provided exteriorly with a line connecting element, said structure extending above and depending below said member, said means mounted on the top of said structure, a contact element carried by said supporting structure, and means interposed between said signalling means and said float member and having a line connecting element and adapted when operated by a pull on the line to engage said contact element for closing the circuit of said signalling means carried by said structure and to make the latter active, said last mentioned means arranged exteriorly of the float member, structure and signalling means.

4. A fish line float including a float member provided therein with a sleeve for the passage of a line and further provided therein with a counterbalance spaced from the sleeve, an electrical signalling means arranged above the float member, normally in an open circuit and having a line connecting element, a signalling means supporting structure connected intermediate its ends to and extending above and depending below said float member and provided exteriorly thereof with a line connecting element, a contact element carried by said supporting structure, means interposed between said signalling means and said float member and having a line connecting element and adapted when operated by a pull on the line to engage said contact element for closing the circuit of said signalling means to make the latter active, said last mentioned means arranged exteriorly of the float member, structure and signalling means and carried by the structure, and means carried by the supporting structure for adjusting the position of said contact element to provide for the closing of the circuit on varying pulls on the line.

5. A fish line float comprising a float member provided with means for connecting the line therewith, a housing connected intermediate its ends to and projecting above and extending below said float member and carrying an electrical source, an upstanding support secured to the top of the housing, an electrical signalling means mounted on the top of said support, connected to said source and normally in an open circuit, a normally open circuit closing device for said signalling means, said device arranged above said member and carried by said support and housing and adapted to be operated by a pull on the line for closing the circuit to the signalling means to make the latter active, means for anchoring the line to said signalling means, and means for slidably connecting the line to said device and housing.

6. A fish line float comprising a float member provided with means for connecting the line therewith, a housing connected intermediate its ends to said float member and carrying an electrical source, an upstanding support secured to the top of the housing, an electrical signalling means mounted on said support, connected to said source and normally in an open circuit, a normally open circuit closing device for said signalling means, said device arranged above said member and carried by said support and housing and adapted to be operated by a pull on the line for closing the circuit to the signalling means to make the latter active, means for anchoring the line to said signalling means, means for slidably connecting the line to said device and housing, and revoluble means mounted on said support for adjusting said device to provide for its operation by pulls of varying strengths on the line.

7. A fish line float comprising a float member having means for the passage of a line therethrough, a housing connected intermediate its ends to said float member centrally of the latter, a source of electrical energy within said housing, an upstanding support secured to the top of the housing, an electrical signalling means in the form of a light mounted on the upper end of said support, connected to said source, and normally in an open circuit, a circuit opening and closing device for said signalling means, arranged above said member and connected with said support and housing and adapted to be operated by a pull on the line for closing the circuit for said signalling means to make the latter active, an enclosing structure for said signalling means, said structure provided with lenses and carried by the upper end of said support, and means carried by said structure for anchoring the line thereto.

8. A fish line float comprising a float member having means for the passage of a line therethrough, a housing connected intermediate its ends to said float member centrally of the latter, a source of electrical energy within said housing, an upstanding support secured to the top of the housing, an electrical signalling means in the form of a light mounted on the upper end of said support, connected to said source, and normally in an open circuit, a circuit opening and closing device for said signalling means, arranged above said member and connected with said support and housing and adapted to be operated by a pull on the line for closing the circuit for said signalling means to make the latter active, an enclosing structure for said signalling means, said structure provided with lenses and carried by the upper end of said support, means carried by said structure for anchoring the line thereto, and revoluble means carried by the support for adjusting said device to provide for its operation by pulls of varying strengths on the line.

9. A fish line float comprising a float member provided with a sleeve for the passage of the line and further provided with a counterbalance spaced from the sleeve, a housing connected intermediate its ends to said float member centrally of the latter and having arranged therein a source of electrical energy, an upstanding support secured to the top of the housing, an electrical signalling means carried at the top of said support, connected to said source and normally in an open circuit, a normally open circuit closing device for said signalling means, arranged above said member and connected with said support and housing and adapted to be operated by a pull on the line for closing the circuit for said signalling means to make the latter active, revoluble means carried by said support for adjusting said device to provide for its operation by pulls of varying strengths on the line, means for slidably connecting the line to said device and to said housing interiorly thereof, and means for anchoring the line with said signalling means.

10. A fish line float comprising a float member in the form of a circular disc provided with a centrally disposed opening, said member further formed with an inclined opening at a point between the first mentioned opening and the edge of the member, said member further provided in its lower face with a counterbalance at a point between the first mentioned opening and the edge of the disc, an electrical signalling means arranged above said float member, normally in an open circuit and provided with a line connecting element, a sleeve extending through the second mentioned opening and through which passes the line, a signalling means supporting structure extending through said first mentioned opening and secured to said member, and means interposed between said signalling means and said float member for connection to and operated by a pull on the line for closing the circuit to said signalling means to make the latter active, said last mentioned means arranged exteriorly of the float member, signalling means and structure and carried by the latter.

11. A fish line float including a buoyant disc provided with an opening at a point between its axis and its edge, said disc further having a counterbalance spaced from said opening, a sleeve secured in said opening and providing for the passage of a line therethrough, an electrical signalling means arranged above said disc, normally in an open circuit and having a line connecting element, a supporting structure extending through said disc centrally thereof and extending above and projecting below the disc, a contact element carried by said structure upon said disc, means interposed between said signalling means and said disc for connection with and operated by a pull on the line to engage the contact element for closing the circuit to said signalling means to make the latter active, said last mentioned means carried by said structure and arranged exteriorly of the disc, supporting structure and signalling means, and revoluble means carried by the supporting structure for adjusting the position of said contact element to provide for the closing of the signalling circuit on various pulls on the line.

In testimony whereof, we affix our signatures hereto.

LEWIS P. BUBB.
JAMES W. MUNDY.